UNITED STATES PATENT OFFICE.

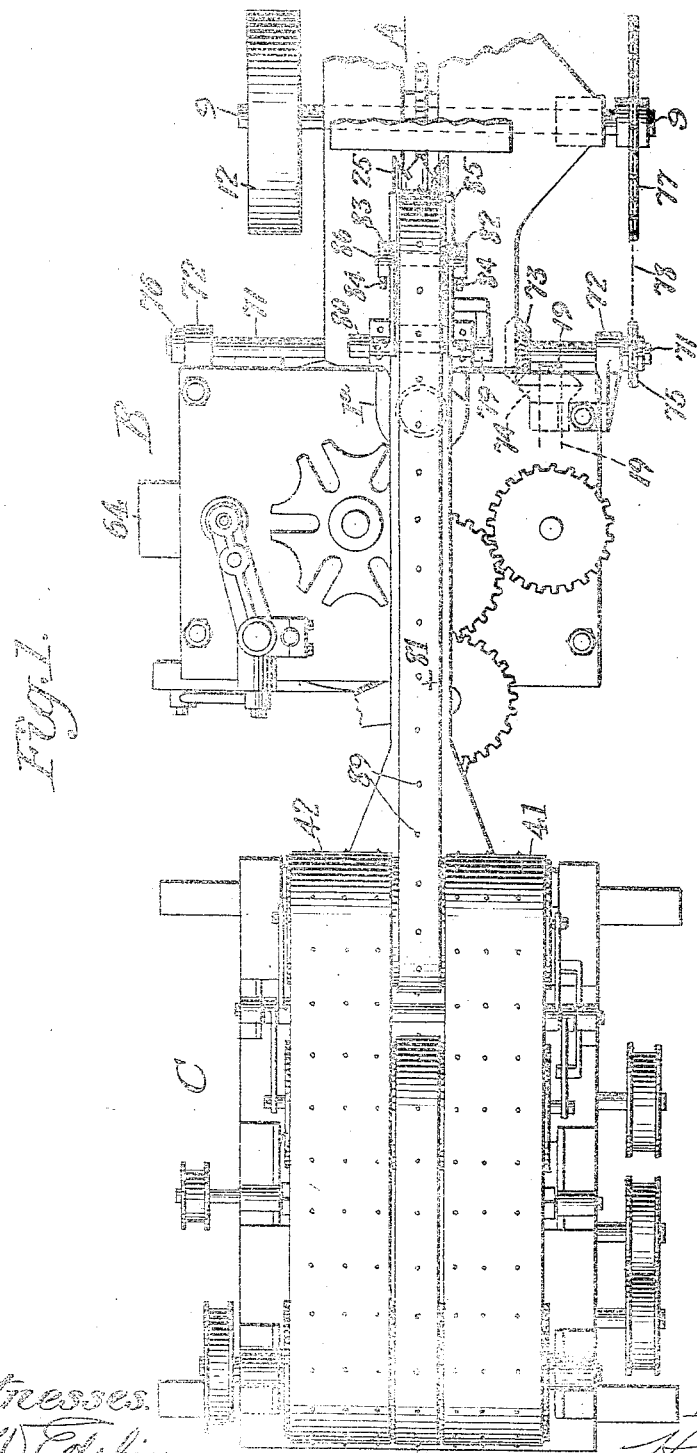

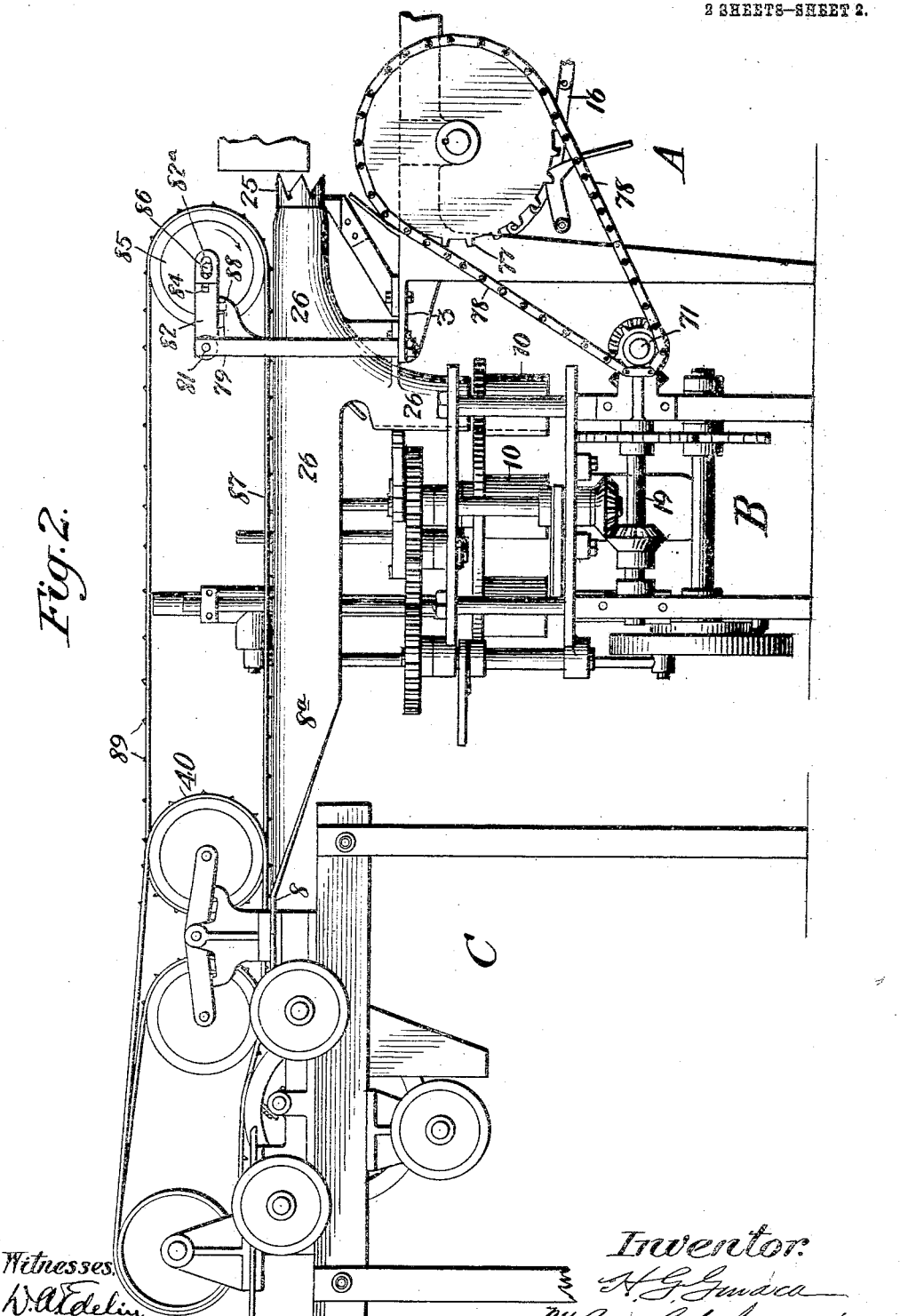

HENRY GABRIEL GINACA, OF HONOLULU, TERRITORY OF HAWAII, ASSIGNOR TO HAWAIIAN PINEAPPLE COMPANY, LTD., OF HONOLULU, TERRITORY OF HAWAII, A CORPORATION OF THE TERRITORY OF HAWAII.

SYSTEM OF TREATING FRUIT.

1,060,250.  Specification of Letters Patent.  Patented Apr. 29, 1913.

Application filed June 6, 1912. Serial No. 702,057.

*To all whom it may concern:*

Be it known that I, HENRY GABRIEL GINACA, a citizen of the United States, residing at Honolulu, county of Honolulu, Territory of Hawaii, have invented certain new and useful Improvements in Systems of Treating Fruit; and I do hereby declare the following to be a full, clear, and exact description of the invention, such as will enable others skilled in the art to which it appertains to make and use the same.

This invention relates to a system of treating fruit, particularly pineapples, whereby the fruit may be sized, its ends trimmed off and cored, and the good portion of fruit trimmed from the rind, all of these operations being accomplished in a rapid, automatic, continuous and efficient manner. Heretofore these various operations have been performed by separate machines, which are more or less automatic in their action and which require more or less handling of the fruit.

The object of the present invention, however, is to produce a system whereby all handling of the fruit is eliminated, the fruit being treated in an automatic manner throughout, and at the same time more rapidly and efficiently than has ever before been done.

The invention contemplates the employment of a series of three machines each having separate functions as hereinafter stated, and means for connecting these machines so that they may work in conjunction with one another. The first of these machines feeds the fruit and pushes it through a sizing knife, whereby the fruit is sized and the barrel shaped shell or outer portion of the fruit with rind is removed in one piece, this machine being described in my application for patent entitled Machine for treating fruit, filed April 30th 1912, Serial No. 694,081. The function of the second machine in the series, which receives the sized fruit discharged from the first machine, is to cut off and remove the ends of the fruit and also to core the fruit; such a machine is described in my application for patent filed May 15, 1912, machine for treating fruit, Serial No. 697,385. The third machine of the series, which trims the good portion of the fruit from the rind of the barrel shaped shells discharged from the first machine, is described in my application for patent, machine for trimming fruit, filed May 22, 1912, Serial No. 698, 995.

As the machines are each fully described in the above mentioned applications, a detailed description of the three machines is hereinafter omitted.

The invention consists in the novel combination, arrangement and coupling of the machines and apparatus, as hereinafter fully described and claimed, reference being had to the accompanying drawings, forming a part of this specification, in which—

Figure 1 is a plan view showing the relation of the three machines and the connecting apparatus embodying my invention. Fig. 2 is a side elevation of the same.

Reference numerals from 71 upward refer to the parts which are added in order that the three machines may work in conjunction with one another, the other reference characters being the same as used in the three applications above stated.

Referring to the drawings, A represents the first machine of the series, which sizes the fruit.

B represents the second machine which trims off the ends and also cores the fruit.

C represents the third and last machine of the series, whose function is to trim off and separate the good portion from the rind of the barrel shaped shells discharged from machine A.

The rear end of the machine A is placed on the right hand side of machine B, so that the lower end of the T shaped casting 26 of machine A is directly over one of the tubes 10 and in the opening or notch 1ª of the plate 1 of machine B. The front end of machine C is placed on the left hand of machine B. The rear end of the casting 26 of machine A is extended over the top of machine B and is either connected to or made a part of the horn 8ª of the feed plate 8 of machine C, as shown. The shaft 9 of machine A is revolved by means of a belt or chain from any suitable source of power applied to the pulley or sprocket 12. The machine B is driven by the machine A such that each step by step movement of the tubes 10 of machine B will correspond with the discharge of a sized fruit from machine A. The shaft 71 is provided, journaled in the bracket bearings 72 fastened to two of the legs of machine B. A miter gear 73 is secured to the shaft 71 to mesh with the miter gear 74 fastened to the end of the shaft 19 of machine B, so that the shafts 71 and 19 will revolve at the same speed. A sprocket wheel 75 and a set collar 76 are secured to the ends of the shaft 71 outside of the bracket bearings 72. A sprocket wheel 77 is fastened to the shaft 9 of machine A, and the chain 78 connects the sprocket wheels 75 and 77. The number of teeth in these sprocket wheels are made such that the shaft 71, and consequently the shaft 19 of machine B, will make one revolution for each fruit forced through the sizing knife 25 of machine A, in order that a tube 10 of machine B may be in position, under the lower end of the T shaped casting 26 of machine A, receive a sized fruit when discharged through said casting.

Means are provided for dragging the shells or outer portion of the fruit rearward on the casting 26 of machine A and onto the horn 8ª and feed plate 8 of machine C. The vertical posts 79 and 80 are secured upon the rear end of the table 3 on opposite sides of the casting 26 of machine A. The bar 81 is adapted to turn in holes through the upper ends of the posts 79 80. Two arms 82 83 are fastened to the bar 81 between the posts 79 80, and each is provided with a slot 82ª 83ª, and with an adjusting screw 84. A pulley or drum 85 is adapted to turn between the arms 82 and 83 on the bar 86 supported in the slots 82ª 83ª. An endless belt 87 is stretched over the pulley or drum 85 and the drum 40 and between the belts 41 42 of machine C. The post 79 is provided with a projecting arm 88 to form a stop to engage the arm 82 and thereby limit the downward movement of said arm due to the weight of the pulley or drum 85, in which position the belt 87 clears the top of the casting 26 of machine A. The speed of the belt 87 is preferably slightly faster than that of the chain 16 with propelling attachments 19 of machine A, in order that each of the shells may be dragged rearward and not interfere with the shell of the succeeding fruit. The belt 87 may be provided with projections 89 to engage the rind.

In operation, the fruit fed to machine A is pushed rearward and through the sizing knife 25, each fruit sized thereby being discharged through the casting 26 into a tube 10 of machine B, the shells being dragged rearward upon the casting 26 by the belt 87 are fed to machine C whereby the good portion of fruit is trimmed from the rind. The sized fruit thus fed to machine B has its ends trimmed off, is cored, and is then discharged through the chute 64 of said machine. It will now be noted that the fruit is sized, its ends are trimmed off, and it is cored, that the good portion of fruit is trimmed from the rind, that these operations are performed automatically in a rapid, continuous and efficient manner, and that handling of the fruit has thus been eliminated.

I claim:

1. A system of treating fruit comprising, a machine for sizing, a machine for trimming off the ends and for coring, a machine for trimming the good fruit from the rind of the shells, and means connecting said machines so that fruit may be treated thereby in an automatic manner.

2. In a system of treating fruit, means for sizing the fruit, means for trimming both ends of the sized fruit irrespective of its length and means for guiding the sized fruit and feeding the same into the means for trimming the ends.

3. In a system of treating fruit, a machine for sizing the fruit, a machine for trimming both ends of the sized fruit irrespective of its length and means connecting said machines so that they will work in unison.

4. In a system of treating fruit, a machine for sizing the fruit, a machine for trimming both ends of the sized fruit irrespective of its length, means for guiding the sized fruit and feeding the same into the machine for trimming the ends, and means connecting said machines so that they work in unison.

5. In a system of treating fruit, means for sizing the fruit, means for removing a good portion of the fruit from the rind of the shells resulting from the sizing, and means for moving said shells of the fruit from the first-named means to the second-named means.

6. In a system of treating fruit, means for sizing, a guide for the shells, means for removing the good portion of the fruit from the rind of said shells, and a belt for moving the shells on said guide from the first-named means to the second-named means.

7. In a system of treating fruit, means for sizing the fruit, means for guiding the sized fruit, a guide for the shells, means for trimming the good portion of the fruit from the rind of said shells, and means for moving the shells upon said guide to feed them to said trimming means.

8. In a system for treating fruit, means for sizing, means for trimming the good fruit from the rind of the shells, and a guide for the shells connecting said means.

9. In a system of treating fruit, means for sizing, means for trimming the good fruit from the rind of the shells, a guide for the shells connecting said means, and a belt or the like for moving the shells upon said guide.

10. In a system of treating fruit, means for sizing, means for trimming the good fruit from the rind of the shells, and means for moving the shells from the sizing to the trimming means.

In testimony whereof I affix my signature, in presence of two witnesses.

HENRY GABRIEL GINACA.

Witnesses:
ROBT. J. PRATT,
ARTHUR F. EWART.